Patented Aug. 18, 1931

1,819,114

UNITED STATES PATENT OFFICE

ROBERT L. PERKINS, OF EAST AURORA, NEW YORK, ASSIGNOR TO NATIONAL ANILINE & CHEMICAL COMPANY, INC., OF NEW YORK, N. Y., A CORPORATION OF NEW YORK

CONCENTRATION OF ORES BY FLOTATION

No Drawing.   Application filed May 29, 1929.   Serial No. 367,129.

This invention relates to the separation of minerals and the concentration of ores by flotation processes, and is particularly directed to such separation and concentration carried out with the utilization of certain composite aromatic condensation products as flotation agents.

According to the present invention, improved results can be obtained in the flotation separation of minerals and the concentration of ores by carrying out the flotation operation with the addition to the mineral pulp or ore of a composition comprising a complex condensation organic product, i. e., a mixture of organic products, obtainable from an aromatic hydrocarbon, sulfur and anhydrous aluminum chloride.

The composite condensation products or bodies which are utilized as flotation or collecting agents according to the present invention can be prepared by methods described in chemical literature. The flotation agents particularly utilized are the complex or composite condensation organic products which can be prepared by reacting an aromatic hydrocarbon, more especially of the benzene series, e. g., benzene, toluene, xylene, etc., with sulfur and anhydrous aluminum chloride, and are preferably those which are liquid at ordinary temperature. Their composition is not definitely known but they appear to contain organic sulfur bodies. The reaction is preferably carried out in the presence of an excess of the hydrocarbon and at a temperature not higher than the boiling temperature of the reaction mixture. To each 100 parts of hydrocarbon employed in the preparation of the flotation agent, it is advantageous to use from 10 to 35 parts of sulfur and from 5 to 25 parts of anhydrous aluminum chloride. The condensation reaction is preferably carried out between about 60° C. and the boiling temperature of the reaction mixture at ordinary pressure under a reflux condenser. The preparation of a composite condensation organic product derived from benzene, sulfur and anhydrous aluminum chloride will be illustrated in the following example. The parts are by weight.

*Example 1.*—500 parts of benzene, 73 parts of sulfur, and 114 parts of anhydrous aluminum chloride are heated at about 70° C. for about 3 hours in a vessel provided with a reflux condenser. The reaction mixture is then treated with ice, the resulting mixture of oil and water is collectively filtered, and the filtrate is allowed to stratify into an oily and aqueous layer. The aqueous layer contains the aluminum employed in the reaction and the oily layer contains the organic condensation product substantially free from aluminum or aluminum compounds. The oily layer is separated, and the benzene is removed therefrom by distillation. If desired, the complex crude oily organic residue may be purified by cooling and, after standing for awhile, filtering off any sulfur or other insoluble product, e. g., thianthrene, which may have separated out. For further purification it may be treated in any suitable manner, for example, by distillation under reduced pressure. The crude or the purified composite organic product comprises the flotation agent particularly contemplated in the present invention.

In an analogous manner, other complex organic products may be derived from other aromatic hydrocarbons, sulfur and anhydrous aluminum chloride. It may be pointed out that in the preparation of condensation products from hydrocarbons of the benzene series which contain aliphatic sidechains as substituents, it is preferable to employ a relatively small proportion of aluminum chloride as described in U. S. Patents Nos. 1,426,430 and 1,427,182.

In carrying out the flotation process, the flotation agent utilized in the present invention may be incorporated with the ore or mineral pulp in any suitable manner and at any suitable time as will insure a satisfactory flotation. For example, it may be introduced in the mill in which the ore is being ground, usually in the presence of water, or it may be dissolved, suspended or dispersed in any suitable solvent or medium, as for example, in one or more of the well-known flotation oils or oil mixtures, or in water or in an alkali or an alkaline agent, or in any suitable organic solvent or diluent such as, for example, a hydrocarbon, an organic amine, a phenol, or a mercaptan or other organic sulfur compound, and the resulting solution, suspension or dispersion may be incorporated with the ore or ore pulp.

While the composite agents of the present invention show marked action as flotation or collecting agents in ore concentration, they are ordinarily used to advantage in conjunction with a suitable frothing agent, e. g., pine oil, terpineol, etc.

The flotation process can be carried out in any suitable apparatus, for example, those of the pneumatic type as the Callow cell, or those where air is incorporated with the ore mixture by mechanical agitation such as the Janney apparatus or the like.

While the flotation operation may be carried out according to the present invention in an acid or neutral medium, it is, in general, advantageous to use a medium having an alkaline reaction. To this end, caustic soda, soda ash, calcium oxide or hydroxide, or other well-known alkaline agent, may be added to the flotation circuit.

The amount of flotation agent incorporated with the mineral pulp will vary, it depending partly on the character and composition of the ores, and partly on other factors, e. g., the conditions of the operation. Ordinarily, one-sixth to one pound of the flotation agent per ton of ore will be sufficient, but more or less than these amounts may be used.

The following example will illustrate the utilization of the flotation agents contemplated in the present invention. The parts are by weight.

*Example 2.*—500 parts of a copper sulfide ore (of the Anaconda Copper Company) assaying 1.51 per cent copper was ground in a ball mill to a pulp powder (about 40 mesh) with 250 parts of water and 0.75 parts of hydrated lime (equivalent to 3 pounds per ton of ore). 0.62 parts of the oily condensation product prepared from benzene, sulfur and aluminum chloride, and from which undissolved sulfur and other insoluble products had been separated, as described in Example 1, was then incorporated with the ground pulp, and the mixture diluted with water to give about 15 to 16 per cent solids and subjected to froth flotation in a Janney apparatus. A small amount of pine oil was added, e. g., about 0.02 to 0.03 parts, and the flotation operation carried out for about 15 minutes. 53.3 parts of a concentrate assaying 12.75 per cent copper was obtained which is a recovery of 91.7 per cent of the copper. The tailings assayed 0.14 per cent copper.

It will be understood that the invention is not limited to the above examples, and that in a similar manner, other condensation products, either crude or purified, derivable from the same or other aromtic hydrocarbons, and sulfur and aluminum chloride, for example, the oily condensation products prepared and described in German Patents Nos. 365,169 and 376,718, may be employed as collecting agents in the froth flotation of minerals and the concentration of ores.

It will be further understood that the present invention is applicable to the treatment of various kinds of mineral mixtures, both natural and synthetic, which are amenable to concentration by froth flotation processes.

I claim:

1. In the concentration of ores, the process which comprises subjecting an ore pulp to a froth flotation operation in the presence of a composition comprising a liquid composite condensation organic product derived from benzene, sulfur and aluminum chloride.

2. In the concentration of ores, the process which comprises subjecting an ore pulp to a froth flotation operation in the presence of a composition comprising a liquid condensation organic product which is substantially free from aluminum and which is derivable by interaction of benzene with sulfur in the presence of anhydrous aluminum chloride.

3. In the concentration of ores, the process which comprises subjecting an ore pulp containing copper sulfide to a froth flotation operation in the presence of an organic product derivable by interaction of benzene with sulfur in the presence of anhydrous aluminum chloride.

4. In the concentration of ores, the process which comprises subjecting an ore pulp to a froth flotation operation in the presence of a composition comprising the condensation product obtainable by the reaction of sulfur with an aromatic hydrocarbon belonging to the group consisting of benzene, toluene and xylene, in the presence of anhydrous aluminum chloride.

5. In the concentration of ores, the process which comprises subjecting an ore pulp containing copper sulfide to a froth flotation operation in the presence of an organic product derivable by the interaction of an aromatic hydrocarbon belonging to the group consisting of benzene, toluene and xylene, with sulfur in the presence of anhydrous aluminum chloride.

In testimony whereof I affix my signature.

ROBERT L. PERKINS.

DISCLAIMER 1,819,114.—*Robert L. Perkins*, East Aurora, N. Y. CONCENTRATION OF ORES BY FLOTATION. Patent dated August 18, 1931. Disclaimer filed December 28, 1936, by the assignee, *National Aniline & Chemical Company, Inc.*

Hereby disclaims claims 1 and 3 of said Letters Patent.

[*Official Gazette January 26, 1937.*]